United States Patent
Kojima et al.

(10) Patent No.: US 7,427,026 B2
(45) Date of Patent: Sep. 23, 2008

(54) MEMORY CARD ADAPTER FOR CONNECTING A MINIATURE CARD TO A STANDARD CARD CONNECTOR, ALONG WITH A METHOD OF FABRICATING SAME

(75) Inventors: Yutaka Kojima, Yokohama (JP); Hideyuki Hirata, Yamato (JP)

(73) Assignee: Molex Incorporated, Lisle, IL (US)

( * ) Notice: Subject to any disclaimer, the term of this patent is extended or adjusted under 35 U.S.C. 154(b) by 515 days.

(21) Appl. No.: 10/532,276

(22) PCT Filed: Oct. 8, 2003

(86) PCT No.: PCT/US03/31881

§ 371 (c)(1),
(2), (4) Date: Oct. 17, 2005

(87) PCT Pub. No.: WO2004/040714

PCT Pub. Date: May 13, 2004

(65) Prior Publication Data

US 2006/0124739 A1    Jun. 15, 2006

(51) Int. Cl.
*G06K 7/06* (2006.01)
*G06K 7/00* (2006.01)
*H01R 24/00* (2006.01)

(52) U.S. Cl. .................. 235/441; 235/486; 439/630; 439/945; 439/946

(58) Field of Classification Search ............... 235/441, 235/486; 361/737; 439/945, 946, 630
See application file for complete search history.

(56) References Cited

U.S. PATENT DOCUMENTS

| | | | | |
|---|---|---|---|---|
| 5,155,663 A * | 10/1992 | Harase | ....................... | 439/945 |
| 5,752,857 A * | 5/1998 | Knights | ...................... | 439/945 |
| 6,053,748 A * | 4/2000 | Bricaud et al. | .............. | 439/946 |
| 6,075,709 A * | 6/2000 | Yang | .......................... | 361/737 |
| 6,203,378 B1 * | 3/2001 | Shobara et al. | ............. | 439/638 |
| 6,224,391 B1 * | 5/2001 | Horie et al. | ................. | 439/945 |
| 6,264,506 B1 * | 7/2001 | Yasufuku et al. | ............ | 439/945 |
| 6,776,631 B2 * | 8/2004 | Shimada et al. | ............. | 439/630 |
| 6,915,956 B2 * | 7/2005 | Liu et al. | .................... | 235/492 |
| 7,025,637 B1 * | 4/2006 | Lee | ............... | 439/946 |
| 7,052,295 B1 * | 5/2006 | Lin | .............. | 439/630 |
| 7,172,430 B2 * | 2/2007 | Kojima | ........................ | 439/64 |
| 7,314,388 B2 * | 1/2008 | Yamada et al. | .............. | 439/630 |
| 7,341,194 B2 * | 3/2008 | Lin | .............. | 235/486 |
| 2007/0207676 A1* | 9/2007 | Ying et al. | ................... | 439/630 |

* cited by examiner

*Primary Examiner*—Jared J Fureman

(57) ABSTRACT

An adapter, along with a method of fabricating the adapter, for a memory card connector to enable a miniature memory card to be inserted into a larger, standard memory card connector. A two-part housing is provided of a size and shape to simulate a standard memory card. The housing includes a base housing part defining a substantial portion of an inner cavity for receiving a miniature memory card. An inner housing part is separate from and independent of the base housing part. A plurality of terminals are mounted on the inner housing part to define a subassembly which is mounted on the base housing part. Each terminal includes a first contact portion at one end thereof for engaging an appropriate contact on the standard memory card connector. Each terminal includes a second contact portion at an opposite end thereof for engaging an appropriate contact of the miniature memory card.

2 Claims, 12 Drawing Sheets

MEMORY CARD ADAPTER FOR CONNECTING A MINIATURE CARD TO A STANDARD CARD CONNECTOR, ALONG WITH A METHOD OF FABRICATING SAME

RELATED APPLICATIONS

This application is a national stage application (under 35 U.S.C. 371) of PCT/US03/31881, filed Oct. 8, 2003.

FIELD OF THE INVENTION

This invention generally relates to the art of electrical connectors and, particularly, to the art of memory card connectors. The invention is specifically directed to a memory card adapter for allowing a miniature memory card to be inserted into a larger standard card connector. The invention also is directed to a method of fabricating the adapter.

BACKGROUND OF THE INVENTION

Memory cards are known in the art and contain intelligence in the form of a memory circuit or other electronic program. Some form of card reader reads the information or memory stored on the cad. Such cards are used in many applications in today's electronic society, including video cameras, digital still cameras, smartphones, music players, ATMs, cable television decoders, toys, games, PC adapters, multi-media cards and other electronic applications. Typically, a memory card includes a contact or terminal array for connection through a card connector to a card reader system and then to external equipment The connector readily accommodates insertion and removal of the card to provide quick access to the information and program on the card. The card connector includes terminals for yieldingly engaging the contact array of the memory card. Ejecting devices often are provided for facilitating inserting and ejecting the memory card to and from the card connector.

Because of the extensive use of memory cards in the many applications described above, the size and shape of many memory cards have become fairly standard. Correspondingly, the size of memory card connectors have become fairly standard. However, with the progress of miniaturization of many electronic devices, miniaturization of corresponding memory cards has also been realized. As a result, the card connectors designed for use with larger, standard memory cards cannot be used with the miniature cards without some modifications. Therefore, several types of adapters have been designed for mounting or inserting miniature cards into standard card connectors.

For example, Japanese Patent Laid-Open No. 5-233887 discloses an adapter for a card-like memory board. Japanese Patent Laid-Open No. 10-83434 discloses a card-like adapter for a miniature thin card. Japanese Patent Laid-Open No. 2000-3416 discloses a contact adapter for a chip card. Japanese Patent Laid-Open No. 2000-214971 discloses an adapter for a Compact Flash card.

In the prior art adapters for card connectors as enumerated above, the adapter has one type of terminals provided at one end thereof for connection to the contacts of the card connector, and another type of terminals inside the adapter for connection to the contacts of the miniature card. These two types of terminals are electrically connected to each other by a circuit board installed in the adapter. For instance, in Japanese Patent Laid-Open No. 5-233887, above, reference numeral 4 in FIGS. 1 and 3 represents an electrical connection means corresponding to that circuit board. In Japanese Patent Laid-Open No. 10-83434, above, reference numeral 16 in FIG. 1 represents a connection means that corresponds to the circuit board. In Japanese Patent Laid-Open No. 2000-3416, above, reference numeral 21 in FIG. 3 represents means that correspond to the circuit board. In Japanese Patent Laid-Open No. 2000-214971, above, reference numeral 8 in FIG. 1 represents means that correspond to the circuit board.

Accordingly, the card connector adapters of the prior art include a built-in circuit board and two types of terminals each for connection with a card connector and with a miniature card. This causes problems and considerable expenses in that increased numbers of components, complicated construction and higher manufacturing costs are dominant. The present invention is directed to solving these various problems described above.

SUMMARY OF THE INVENTION

An object, therefore, of the invention is to provide a new and improved adapter for a memory card connector to enable a miniature card to be inserted into a larger standard card connector.

Another object of the invention is to provide a method of fabricating the new and improved adapter.

In the exemplary embodiment of the invention, the adapter includes a housing means of a size and shape to simulate a standard memory card. The housing means include an inner cavity for receiving a miniature memory card. A plurality of terminals are mounted on the housing means. Each terminal includes a first contact portion at one end thereof for engaging an appropriate contact on the standard memory card connector. A second contact portion at an opposite end of each terminal engages an appropriate contact of the miniature memory card. According to one aspect of the invention, the housing means include a base housing defining a substantial portion of the inner cavity, along with an inner housing on which the terminals are mounted. The inner housing is separate from and independent of the base housing. The inner housing may be integrally welded to the base housing, such as by ultrasonic welding.

According to another aspect of the invention, the terminals are stamped and formed of conductive sheet metal material. The terminals have mounting sections between the opposite ends thereof. The mounting sections are press-fit into terminal-receiving passages in the inner housing to form a subassembly.

According to another aspect of the invention, a reinforcing plate is provided for supporting the housing means. The inner housing may comprise an elongated bar. As disclosed herein, the reinforcing plate comprises a narrow band, such as of metal material, running generally parallel to the elongated bar of the inner housing. The reinforcing plate includes a lock member engageable with the miniature memory card inserted into the inner cavity.

The invention also contemplates a method of fabricating the adapter described above. Specifically, the terminals are stamped and formed of sheet metal material. The terminals then are inserted into the terminal-receiving passages of the inner housing to form a subassembly. This subassembly then is assembled to the base housing of the housing means.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 2:
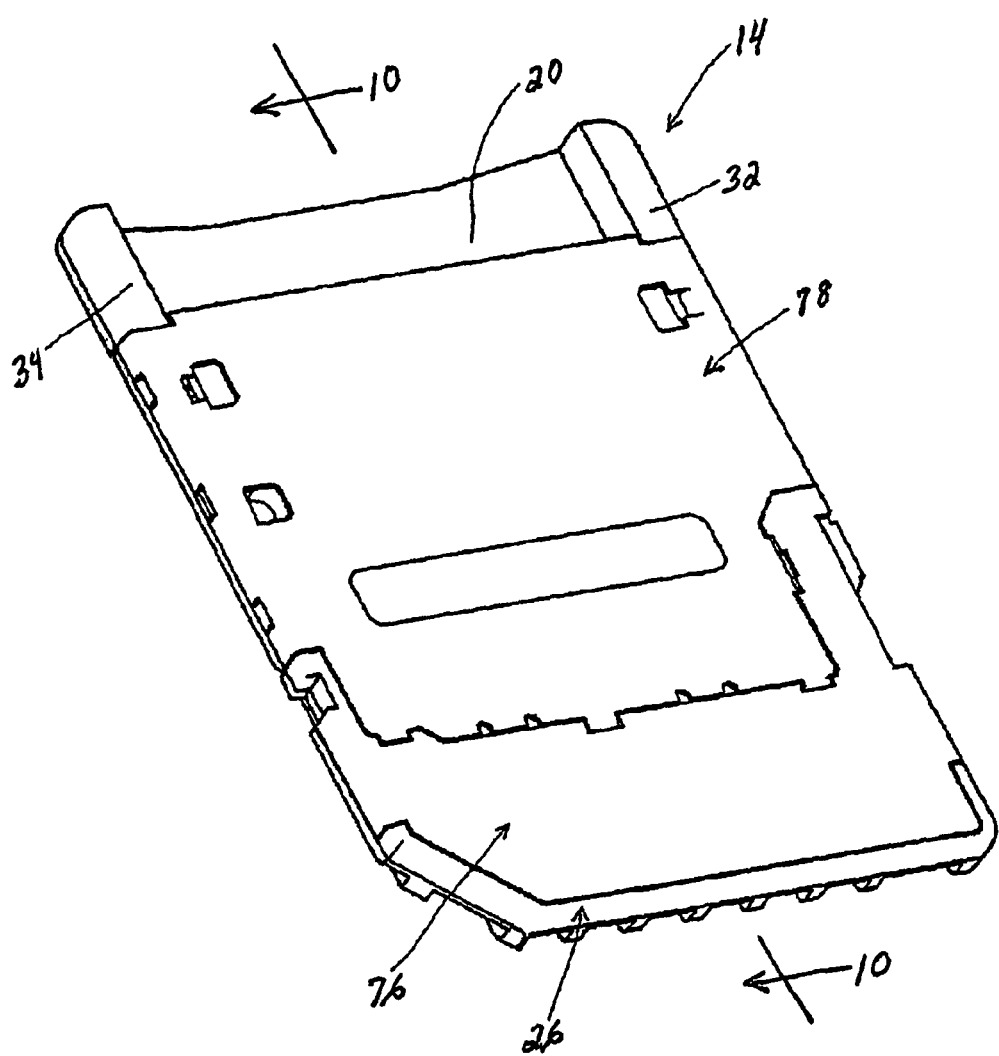
FIG. 2 is a perspective view similar to that of FIG. 1, with the metal shell and cover plate assembled to the housing means of the adapter.
Figure 3:
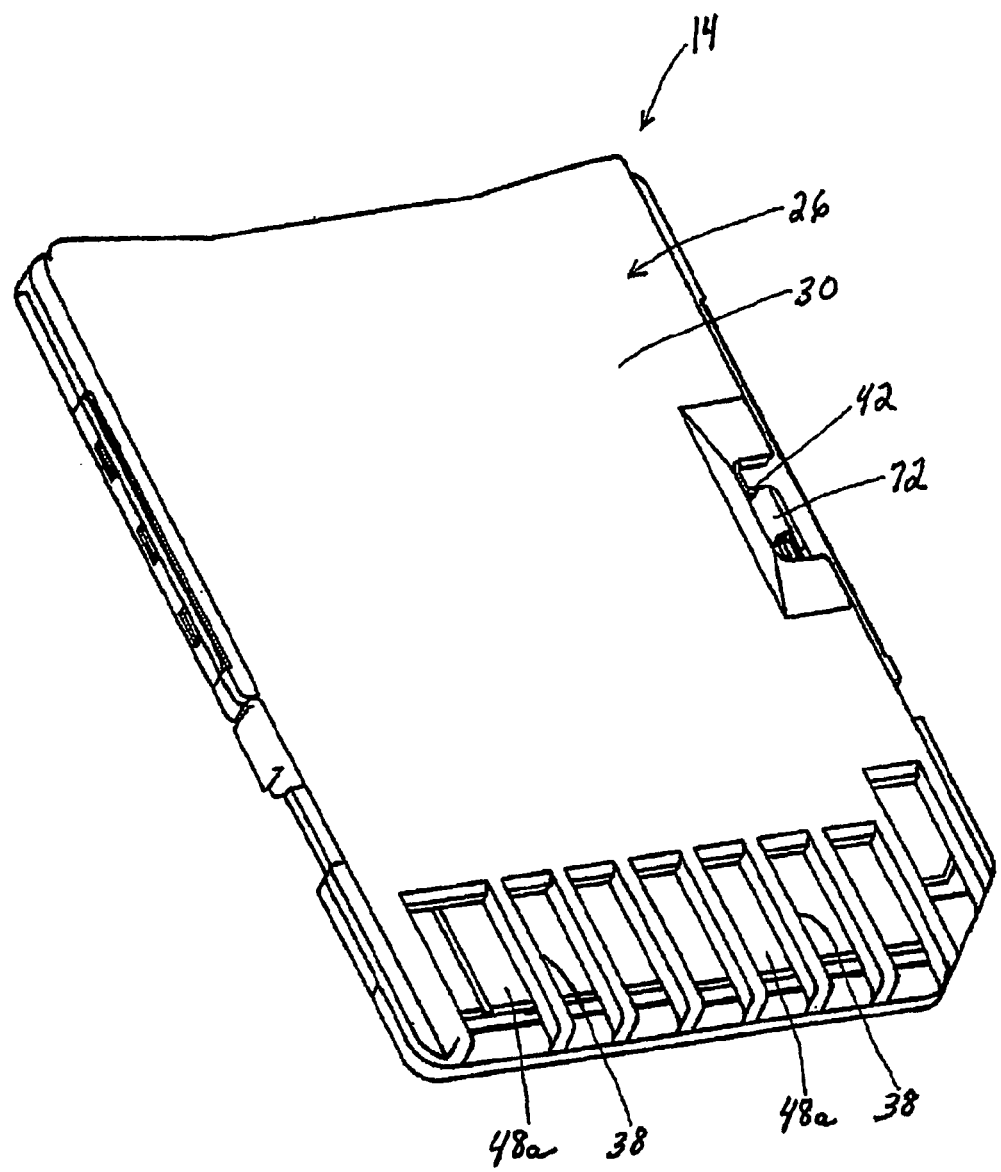
FIG. 3 is a bottom perspective view of the adapter.
Figure 4:
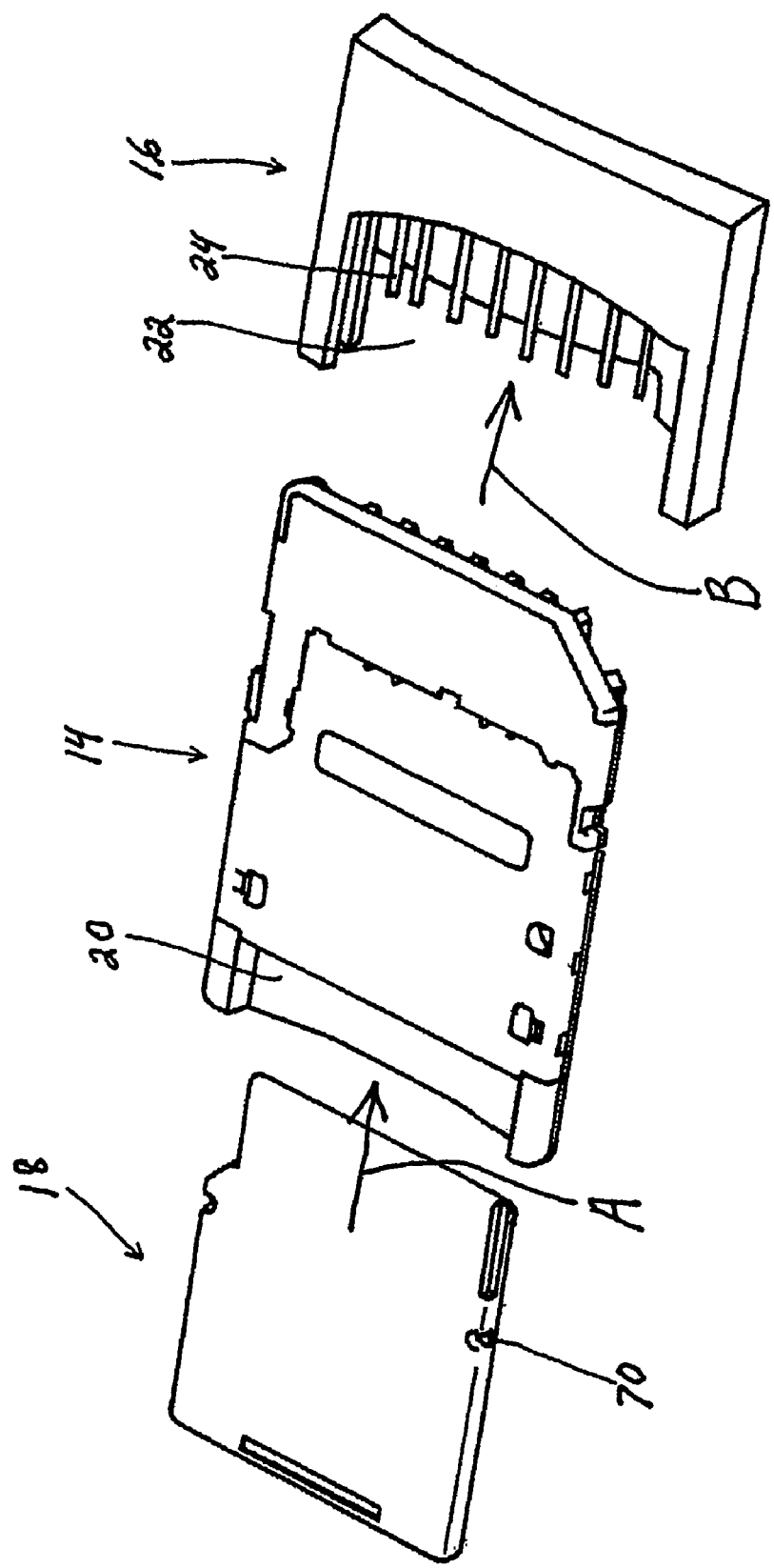
FIG. 4 is a top perspective view of the adapter, on a reduced scale, in conjunction with a standard card connector and a miniature memory card.

Referring to the drawings in greater detail, and first to FIGS. 1-4, the invention is embodied in an adapter, generally designated 14, for use with a standard memory card connector, generally designated 16 (FIG. 4), to enable a miniature memory card, generally designated 18, to be inserted into the larger standard card connector. In other words, as seen in FIG. 4, the smaller miniature card 18 is inserted in the direction of arrow "A" into an inner cavity 20 of adapter 14 which, in turn, is inserted in the direction of arrow "B" into a receptacle 22 of the larger standard card connector 16 which has mating contacts 24.

Figure 1:
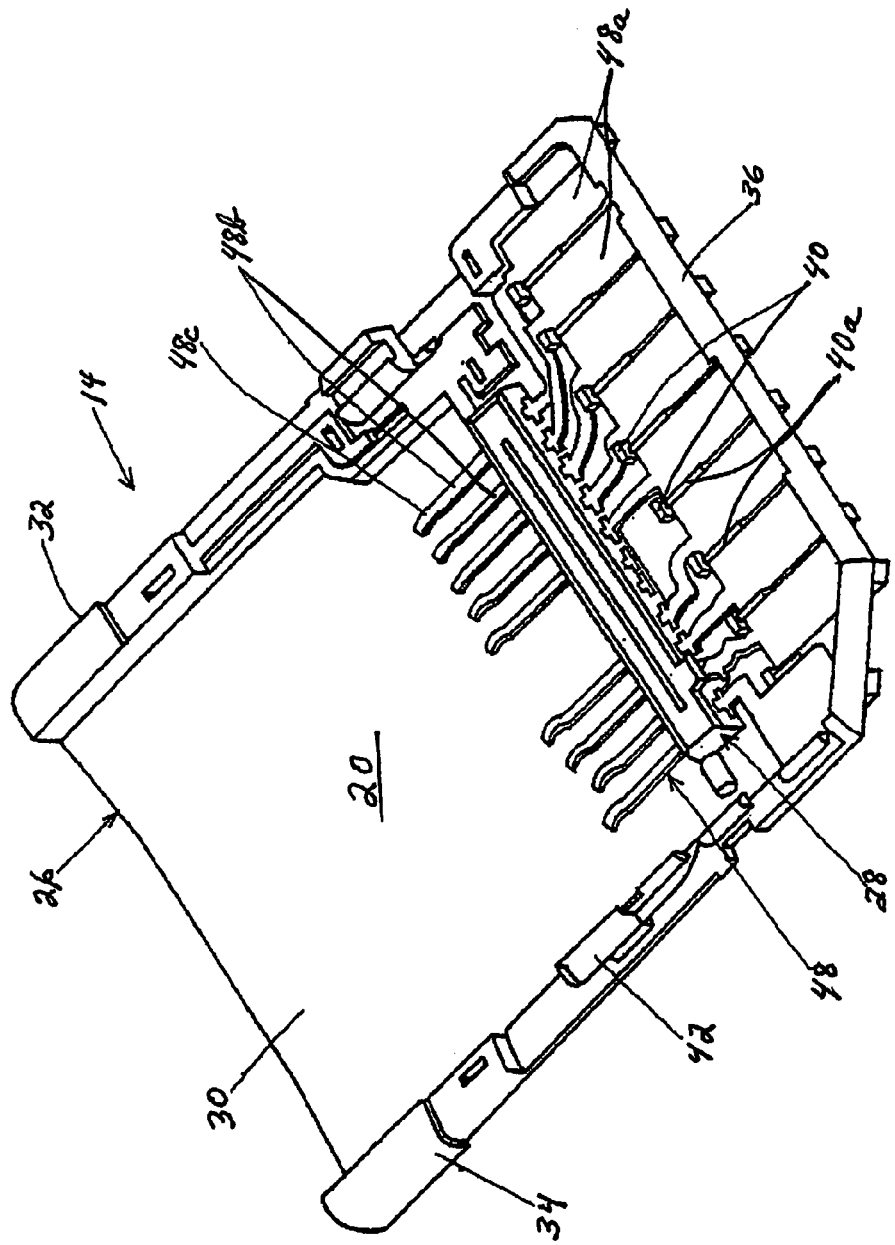
FIG. 1 is a top perspective view of an adapter for a miniature memory card, incorporating the concepts of the invention and with the metal shell, reinforcing plate and cover plate removed to show the interior components of the adapter.

Referring back to FIG. 1, adapter 14 includes a two-part housing means comprising a base housing part ("base housing"), generally designated 26, and an inner housing part ("inner housing"), generally designated 28. Each housing part may be unitarily molded of dielectric material such as plastic or the like. The base housing includes a bottom wall 30 and two side walls 32 and 34, along with a rear wall 36. Bottom wall 30 defines the bottom of inner cavity 20 and side walls 32 and 34 define opposite sides of the inner cavity which receives miniature card 18. As seen in FIG. 3, a plurality of open windows 38 are formed through bottom wall 30 in a side-by-side arrangement along the rear edge of the bottom wall. As seen in FIG. 1, a plurality of support projections having rearwardly extending partitions 40a project upwardly from the top of bottom wall 41 and are located between open windows 38. Finally, a release window 42 is formed in the bottom wall of the base housing along side wall 34.

Figure 5:
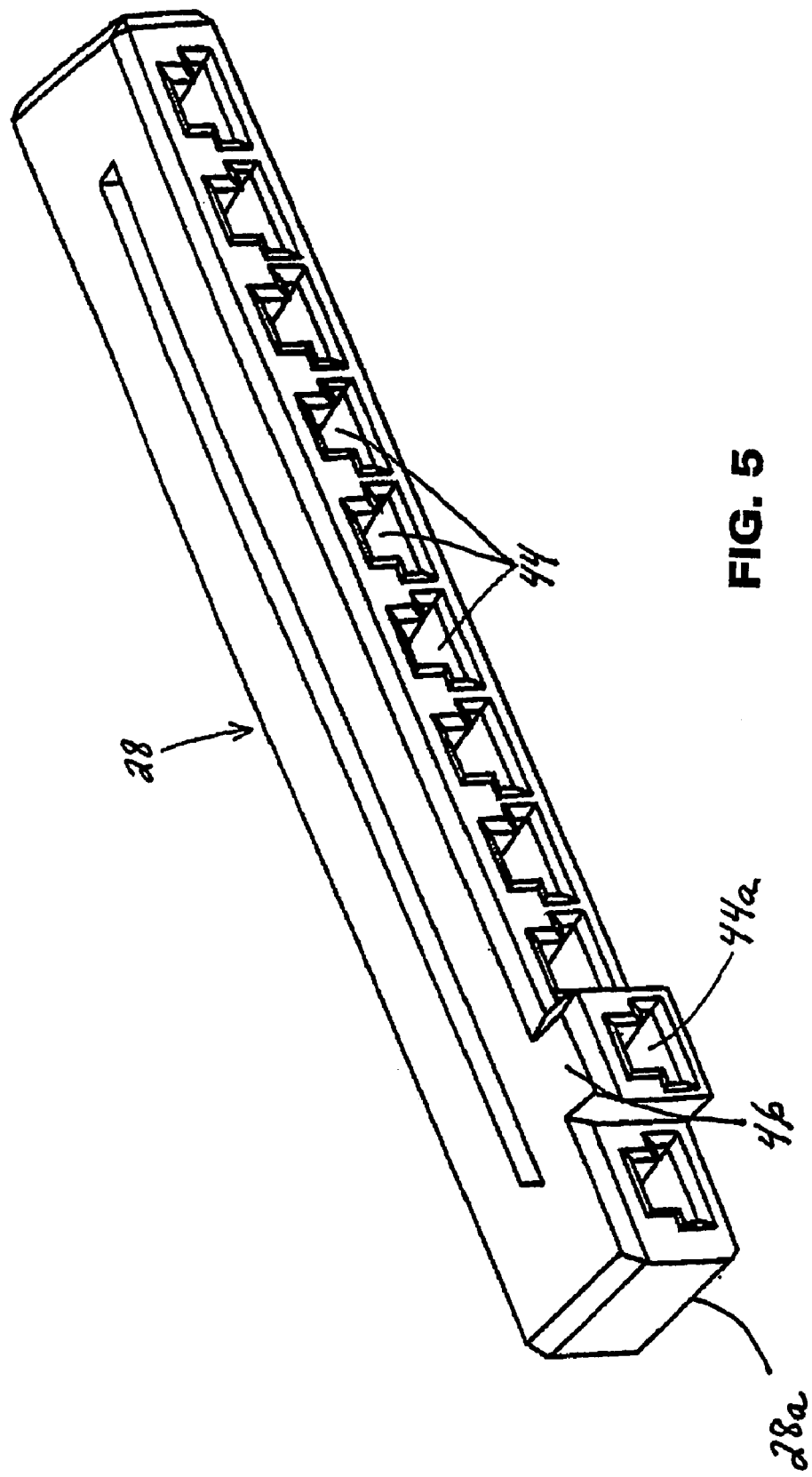
FIG. 5 is an enlarged perspective view of the inner housing of the adapter.

Referring to FIG. 5 in conjunction with FIG. 1, inner housing 28 is molded into the form of an elongated bar having a plurality of terminal-receiving passages 44 extending therethrough. One of the passages 44a extends through a rearwardly projecting portion 46 of the inner housing. The inner housing is separate from and independent of base housing 26, and the inner housing can be secured to the top of bottom wall 30 of the base housing during assembly, as described below. For instance, a bottom surface 28a (FIG. 5) of the inner housing can be ultrasonically welded to the top surface of bottom wall 30 of base housing 26. The inner housing defines the inner wall of inner cavity 20.

Figure 6:
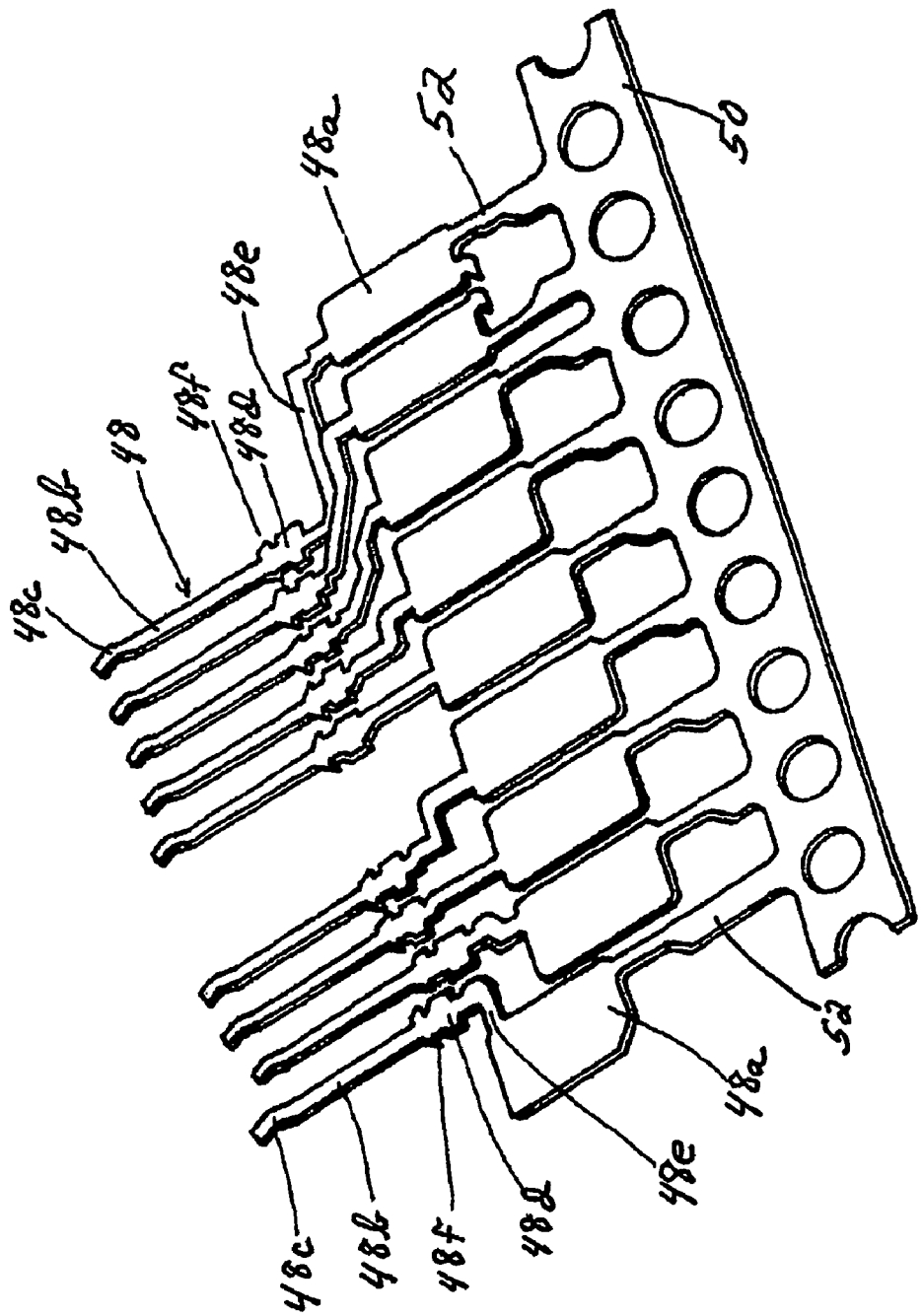
FIG. 6 is a perspective view of the terminals of the adapter as stamped to form a "blank" from a sheet of metal material, with the terminals still connected to a carrier strip.
Figure 7:
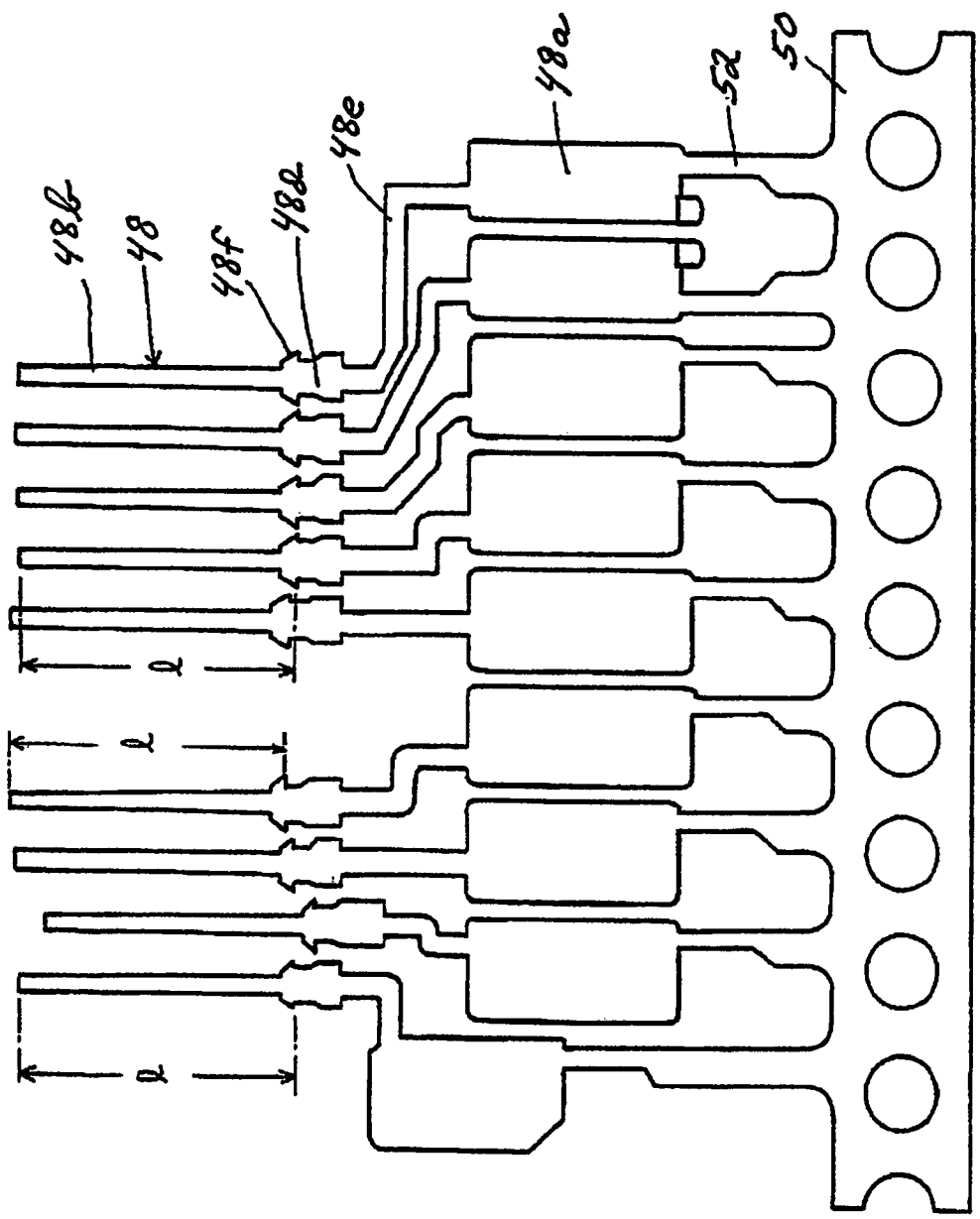
FIG. 7 is a plan view of the stamped blank of FIG. 6.

Referring to FIGS. 6 and 7 in conjunction with FIG. 1, a plurality of terminals, generally designated 48, are mounted within adapter 14, particularly within inner housing 28 of the adapter. The terminals are stamped and formed from conductive sheet metal material. For instance, FIGS. 6 and 7 show the terminals in an array, stamped as a "blank" from the sheet metal material, but interconnected to a carrier strip 50 of the sheet metal material by a plurality of respective webs 52. Each terminal includes a first contact portion 48a in the form of a contact pad for engaging a respective one of the mating contacts 24 (FIG. 4) of standard memory card connector 16. When assembled in the adapter, contact pads 48a are exposed in open windows 38 in bottom wall 30 of base housing 26 as seen in FIG. 3.

Each terminal 48 includes a contact arm 48b having a second contact portion 48c of the terminal at a distal end of the contact arm. Contact arms 48b of the terminals are cantilevered forwardly into inner cavity 20 as best seen in FIG. 1, and contact portions 48c are adapted for engaging appropriate contacts of the miniature memory card 18 (FIG. 4) when the miniature card is inserted into the inner cavity.

Each terminal 48 includes a mounting section 48d intermediate the opposite ends thereof and joined to contact pads 48a by tieing portions 48e. Barbs 48f are formed at opposite edges of mounting sections 48d.

Figure 8:
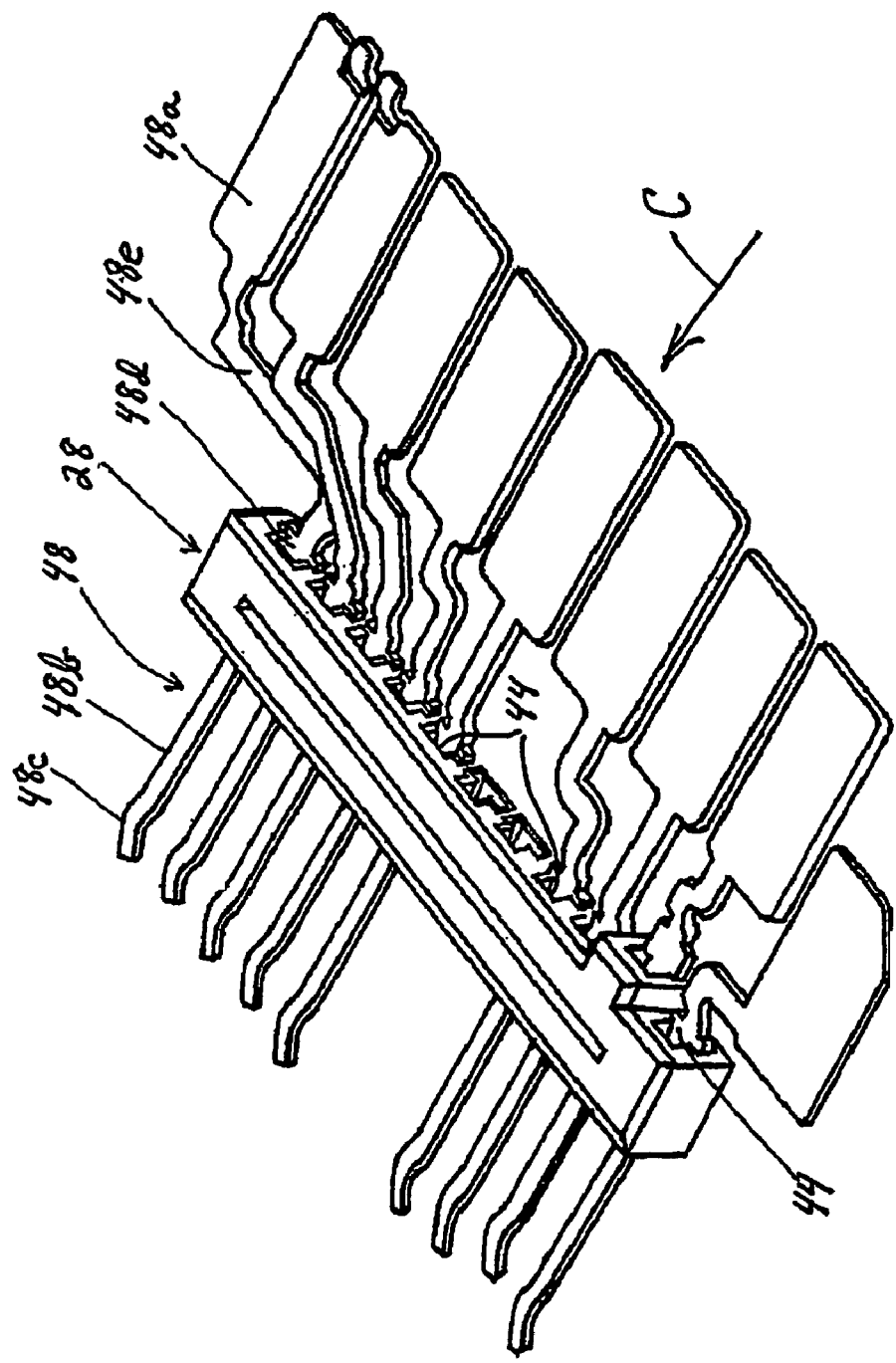
FIG. 8 is a perspective view showing the terminals mounted in the terminal-receiving passages of the inner housing.
Figure 10:
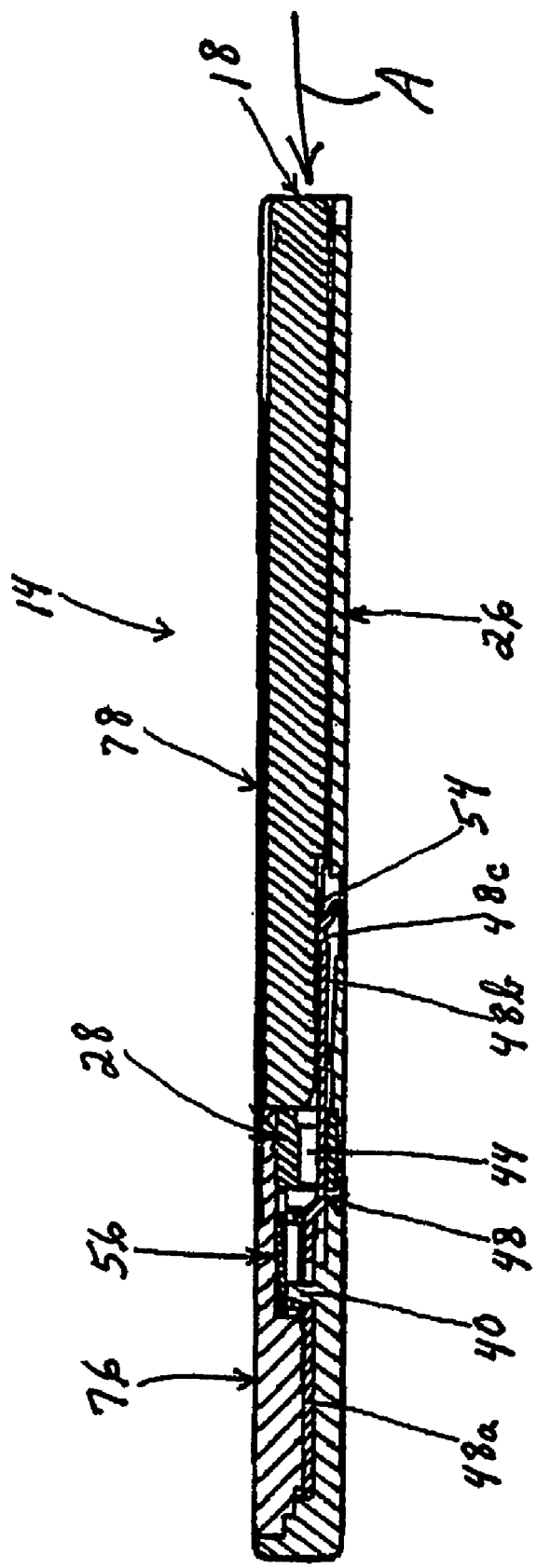
FIG. 10 is a vertical section taken generally along line 10-10 of FIG. 2, with the miniature card inserted into the adapter.

Referring to FIG. 8 in conjunction with FIGS. 6 and 7, terminals 48 can be "gang" inserted into terminal-receiving passages 44 of inner housing 28 in the direction of arrow "C". After insertion, the terminals are removed from carrier strip 50 by severing webs 52. Mounting sections 48d of the terminals are press-fit into the terminal-receiving passages, as barbs 48f (FIGS. 6 and 7), bite into the plastic material of the inner housing within the passages. This subassembly of FIG. 8 then can be mounted in base housing 26 as seen in FIG. 1, and inner housing 28 can be welded to the top surface of bottom wall 30 of the base housing. Support projections 40 and partitions 40a position and isolate contact pads 48a from each other as shown in FIG. 1. When miniature memory card 18 is inserted into adapter 14 as shown in FIG. 10, contacts 54 on the bottom front surface of the miniature card engage contact portions 48c at the distal ends of contact arms 48b of terminals 48. It can be seen that single terminals 48 interconnect the contacts 54 of the miniature memory card with mating contacts 24 of the larger standard card connector 16. As seen in FIG. 7, all of the terminals have equal lengths "1" that is measured from barbs 48f to the distal ends of contact arms 48b. In other words, all of the terminals have substantially equal effective spring lengths as measured from the rigid press-fit mounting sections 48d to the contact portions of the terminals that engage the miniature card. Accordingly, all of the contact portions are formed to have substantially equal resiliency.

Figure 9:
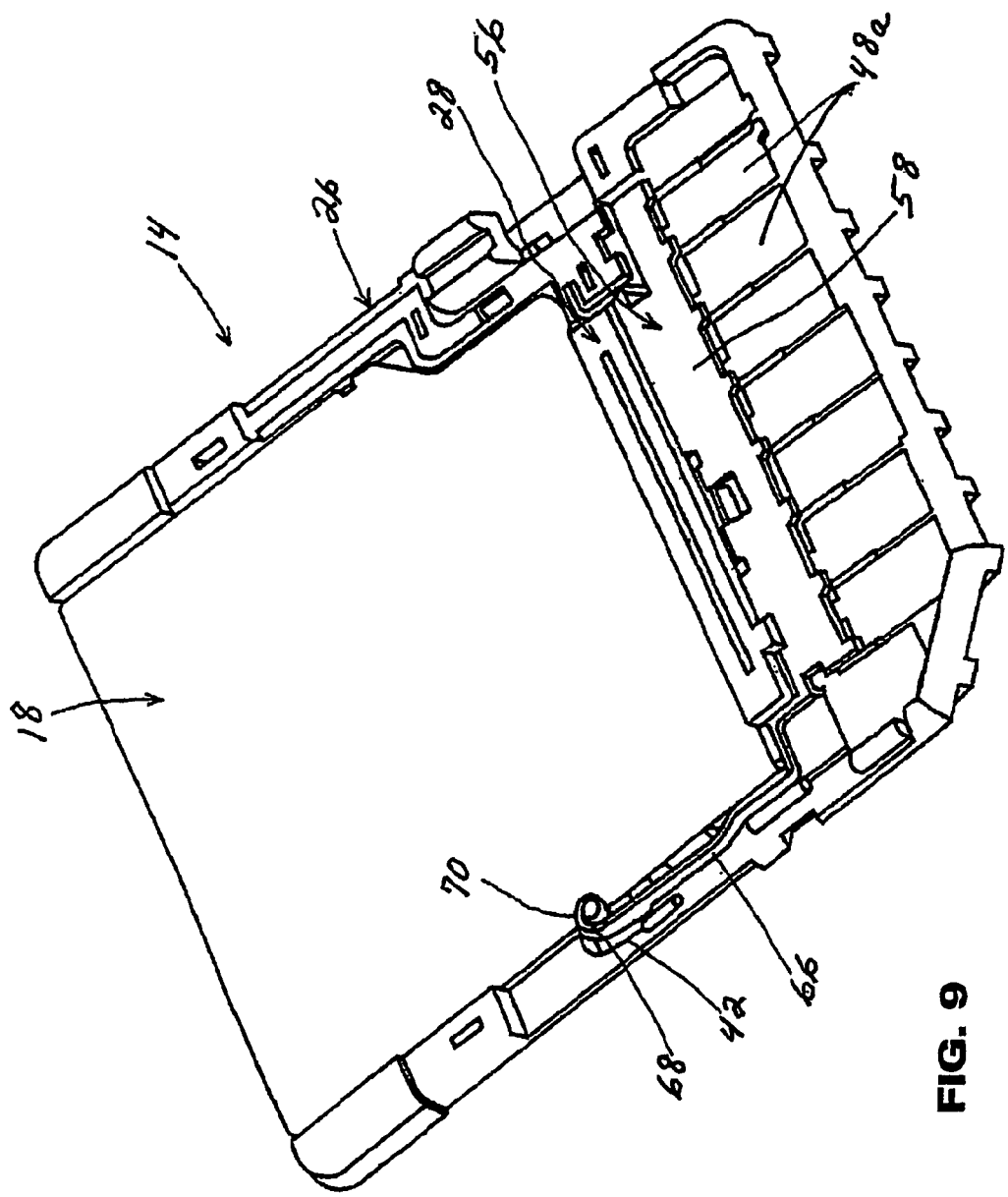
FIG. 9 is a view similar to that of FIG. 1, with the reinforcing plate assembled and the miniature card inserted into the housing means.
Figure 11:
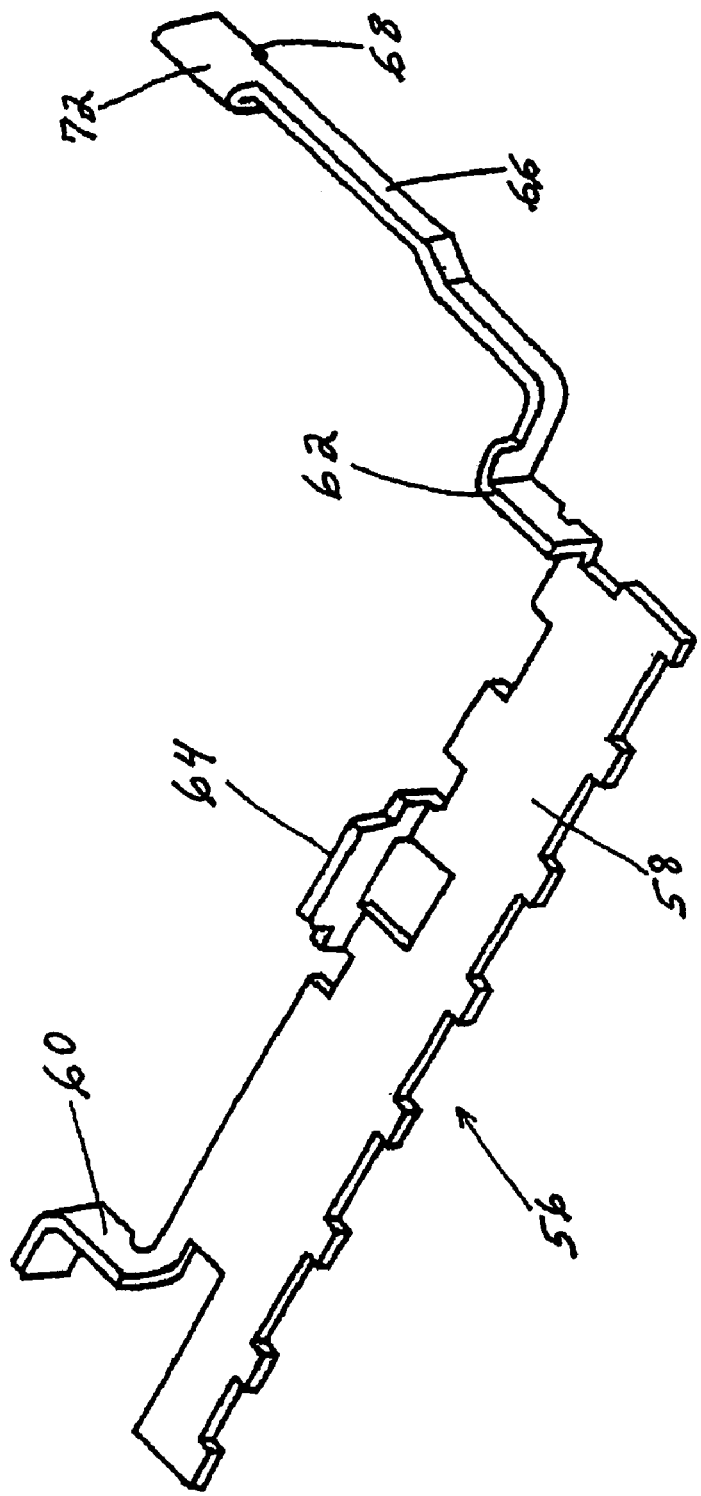
FIG. 11 is an enlarged, bottom perspective view of the reinforcing plate.

Referring to FIG. 11 in conjunction with FIG. 9, a reinforcing plate, generally designated 56, is provided and runs generally parallel to inner housing 28 at the rear thereof. It can be seen in FIG. 9 that the reinforcing plate substantially spans the terminals. The reinforcing plate is provided for reinforcing the strength of base housing 26 and may be stamped and formed of metal material, such as stainless steel. However, a suitable molded plastic component is contemplated. As seen best in FIG. 11, the reinforcing plate includes a narrow band or body portion 58 that runs generally parallel to inner housing 28 as seen in FIG. 9. A pair of L-shaped legs 60 and 62 are formed at opposite ends of body portion 58, and an abutment member 64 is formed intermediate the opposite ends of the body portion. Abutment member 64 abuts against a rear surface of inner housing 28. Leg 62 is provided with a lock arm 66 extending substantially perpendicular to body portion 58.

Figure 12:
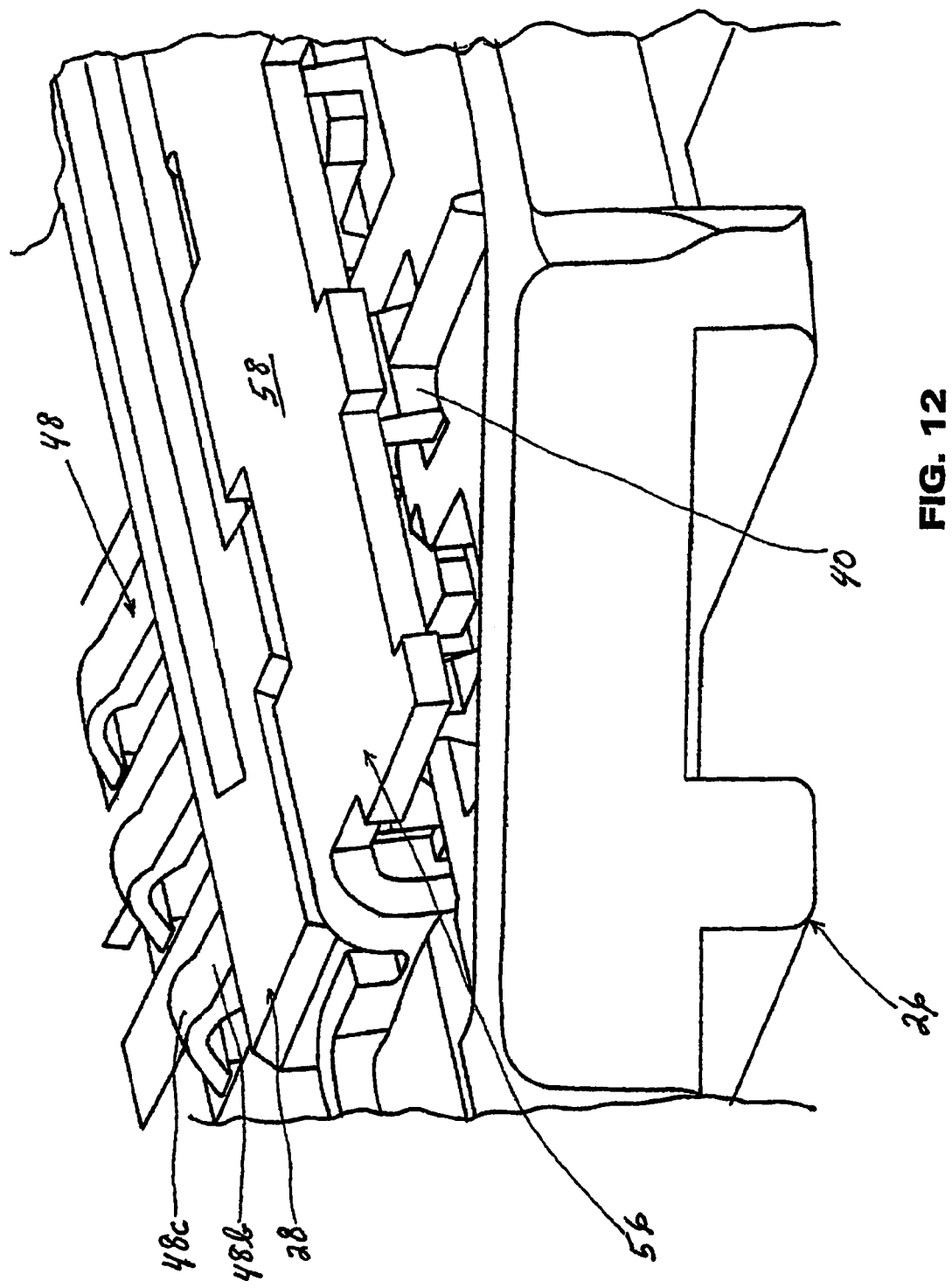
FIG. 12 is an enlarged, fragmented perspective view of an area where the reinforcing plate is supported on the housing.

When reinforcing plate 56 is assembled as shown in FIG. 9, legs 60 and 62 stand on bottom wall 30 (FIG. 1) of base housing 26. Body portion 58 of the reinforcing plate is supported on support projections 40 (FIG. 1) so that a clearance is provided between the body portion and the terminals to prevent any short circuiting therebetween. This can be seen in FIG. 12. Lock arm 66 of the reinforcing plate extends along side wall 34 at one side of inner cavity 20 which receives the miniature memory card.

A lock portion 68 is provided at the distal end of lock arm 66 to align with a cut-out 70 in one edge of miniature memory card 18. Accordingly, as the miniature card is inserted into inner cavity 20, the side edge of the miniature card engages lock portion 68 and biases lock arm 66 outwardly until the lock portion is aligned with cut-out 70 upon which the lock portion snaps into the cut-out to hold the miniature card in its fully inserted position within cavity 20.

Lock portion 68 has a knob 72 at an opposite side thereof as seen in FIG. 11. Knob 72 is exposed at the bottom surface of adapter 14 as seen in FIG. 3. Accordingly, the knob can be operated externally of the adapter to disengage lock portion 68 from cut-out 70 in the side edge of the miniature memory card to remove the card from the adapter.

After reinforcing plate 56 is mounted in the connector, a cover plate 76 is mounted on the base housing over the reinforcing plate. The cover plate is fabricated of dielectric plastic material. In addition, a metal shell 78 is mounted adjacent the cover plate as can be seen in FIG. 2. The cover plate forms the top of inner cavity 20.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

The invention claimed is:

1. An adapter (14) for a memory card connector to enable a miniature memory card (18) to be inserted into a larger, standard memory card connector (16), comprising:
   a two-part housing means (26,28) of a size and shape to simulate a standard memory card and including an inner cavity (20) for receiving a miniature memory card (18), the housing means including a base housing (26) defining a substantial portion of said inner cavity and an inner housing (28) separate from and independent of the base housing; and
   a plurality of terminals (48) stamped and formed of conductive sheet metal material, each terminal including a first contact portion (48a) at one end thereof for engaging an appropriate contact (24) on the standard memory card connector (16), a second contact portion (48c) at an opposite end thereof for engaging an appropriate contact (54) of the miniature memory card (18) and a mounting section (48d) between said opposite ends, the mounting sections of the terminals being press-fit into terminal-receiving passages (44) in the inner housing (28), the adapter characterized by
   a reinforcing plate (56) supporting the base housing (26), wherein said inner housing (28) comprises an elongated bar, and said reinforcing plate (56) comprises a narrow band (58) running generally parallel to the inner housing, and
   wherein said reinforcing plate (56) includes a lock member (68) engageable with the miniature memory card (18) inserted into the inner cavity (20).

2. The adapter of claim 1 wherein said inner housing (28) is integrally welded to the base housing (26).

* * * * *